Figure 3:
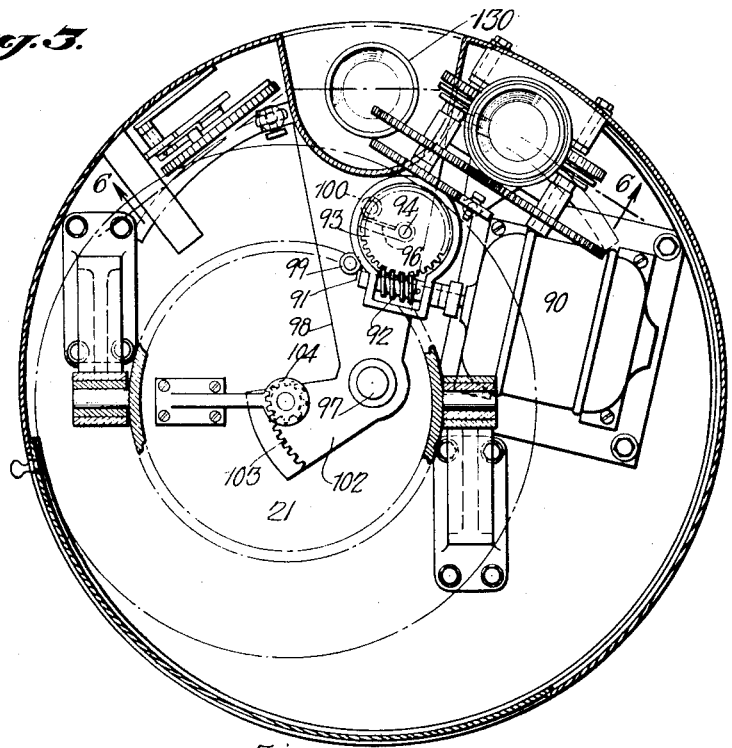

Nov. 14, 1933.　　　G. E. COOK　　　1,935,143
DISPENSING MACHINE
Filed Oct. 3, 1930　　　5 Sheets-Sheet 1
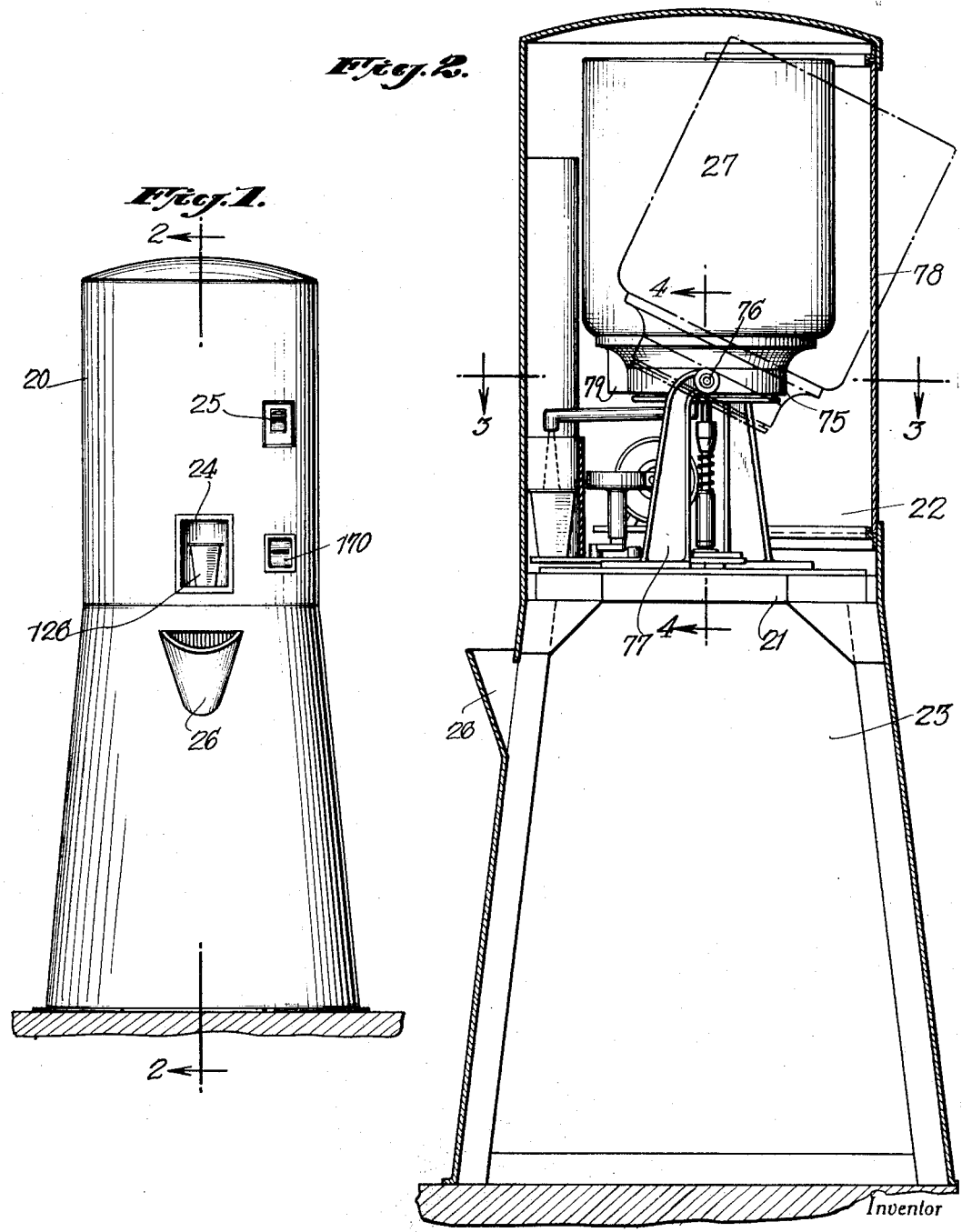
Inventor
GEORGE E. COOK
By Clarence A. O'Brien
Attorney Nov. 14, 1933.    G. E. COOK    1,935,143
DISPENSING MACHINE
Filed Oct. 3, 1930    5 Sheets-Sheet 2

Inventor
GEORGE E. COOK.
By Clarence A. O'Brien
Attorney

Nov. 14, 1933.  G. E. COOK  1,935,143
DISPENSING MACHINE
Filed Oct. 3, 1930    5 Sheets-Sheet 3
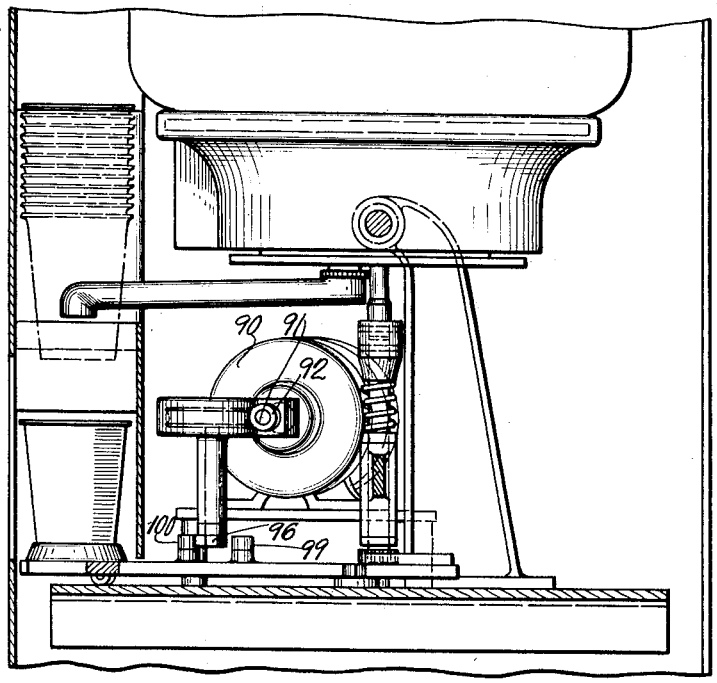
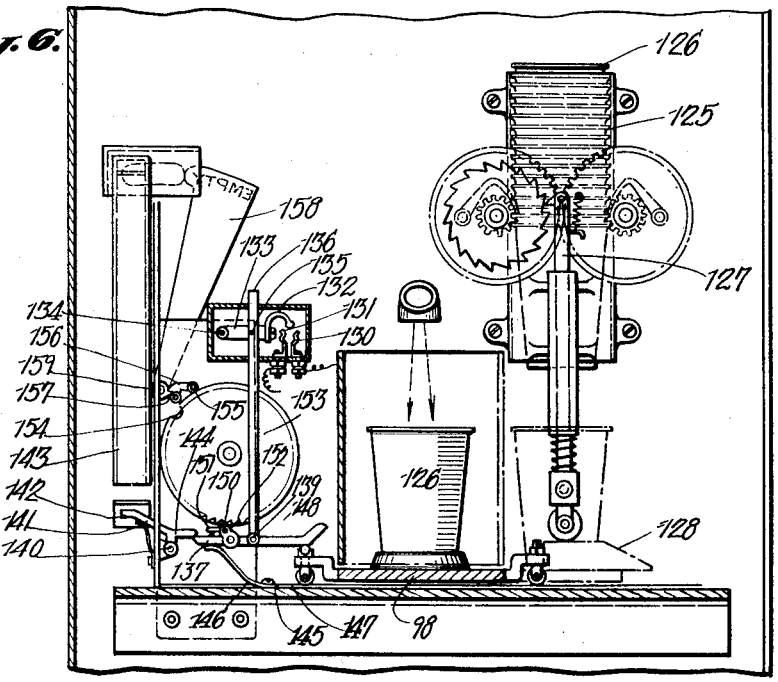
Inventor
GEORGE E. COOK.
By Clarence A. O'Brien
Attorney Nov. 14, 1933. G. E. COOK 1,935,143
DISPENSING MACHINE
Filed Oct. 3, 1930 5 Sheets-Sheet 4
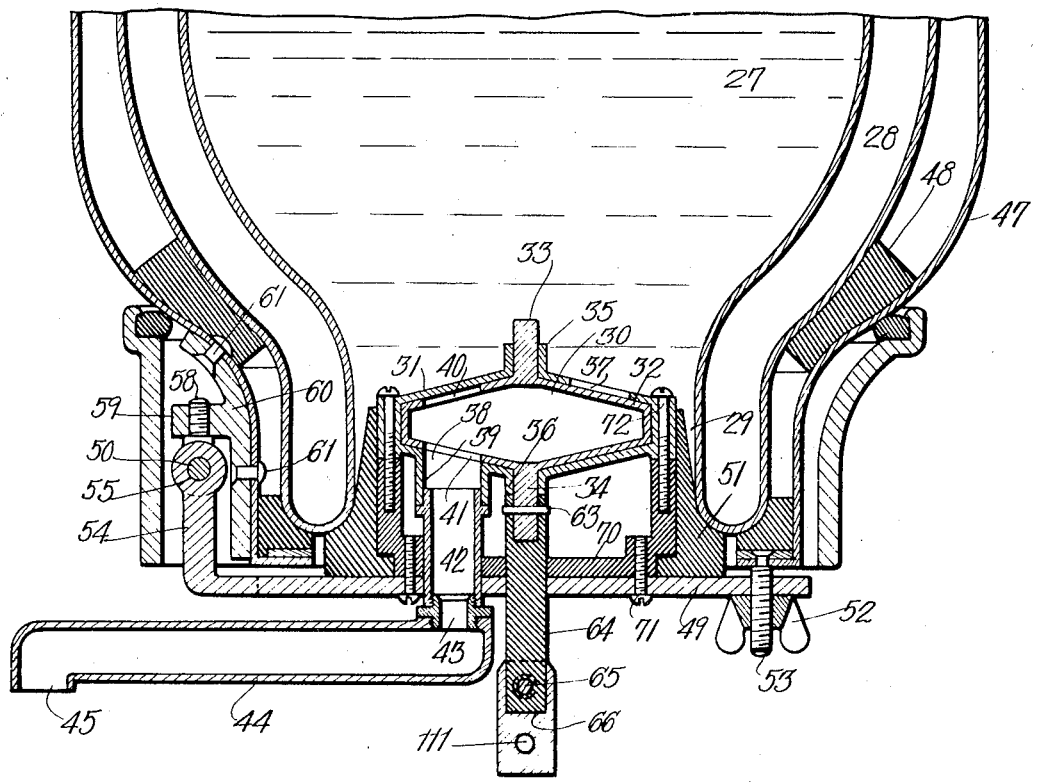
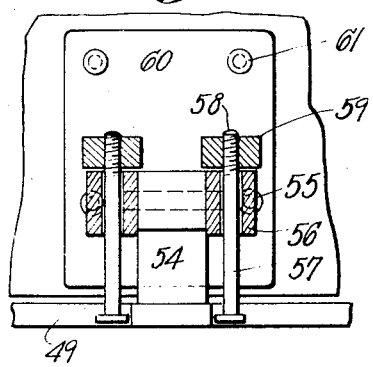
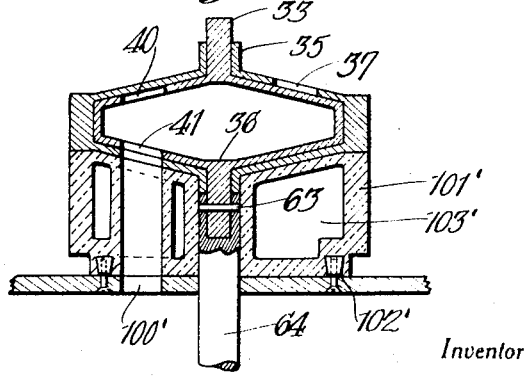
Inventor
GEORGE E. COOK.
By Clarence A. O'Brien
Attorney Nov. 14, 1933.  G. E. COOK  1,935,143
DISPENSING MACHINE
Filed Oct. 3, 1930   5 Sheets-Sheet 5
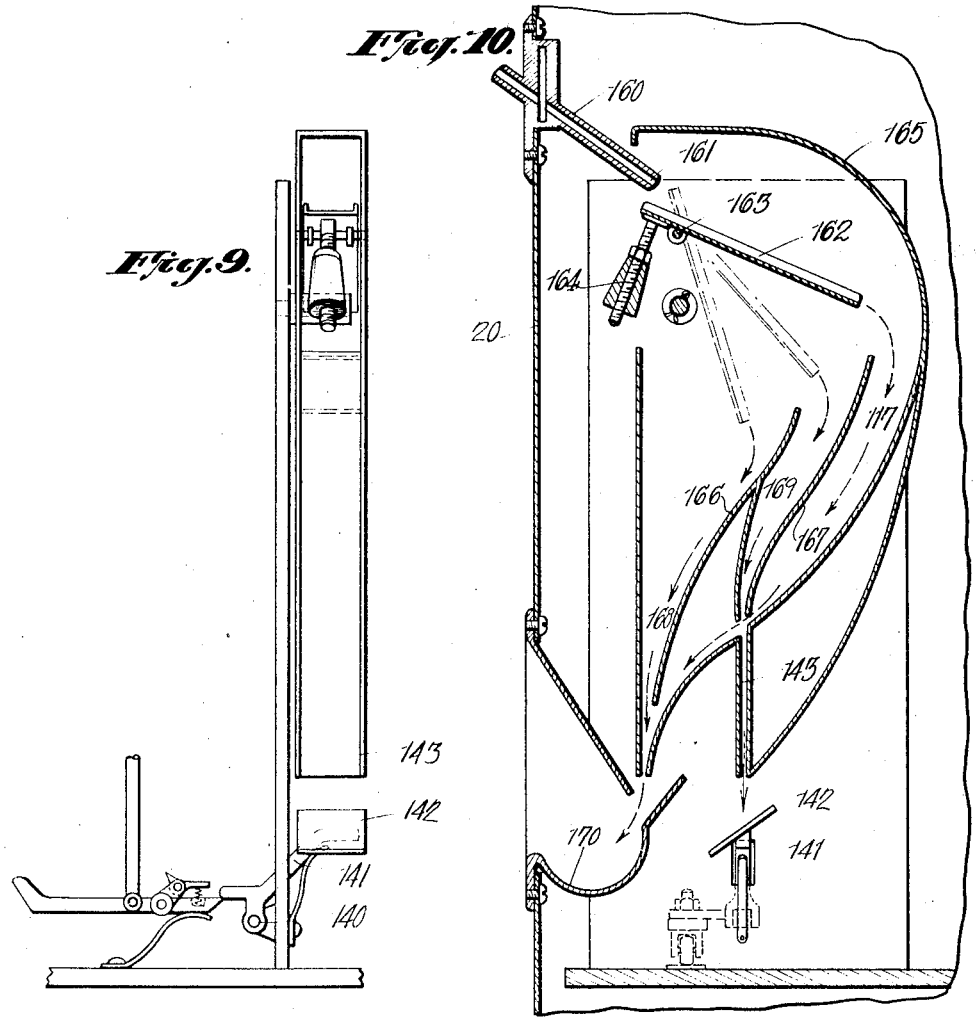
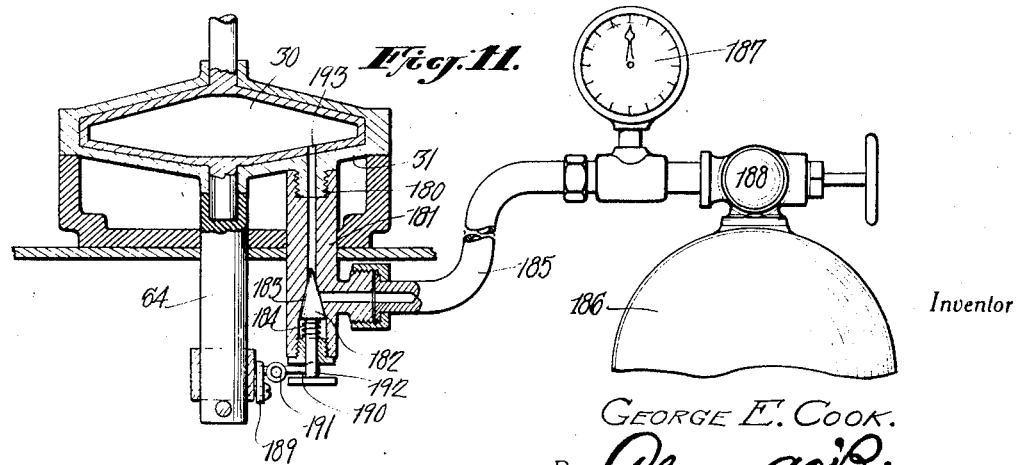
Inventor
GEORGE E. COOK.
By Clarence A. O'Brien
Attorney Patented Nov. 14, 1933

1,935,143

UNITED STATES PATENT OFFICE 1,935,143

DISPENSING MACHINE

George E. Cook, New York, N. Y.

Application October 3, 1930. Serial No. 486,248

3 Claims. (Cl. 226—19)

This invention relates to improvements in dispensing machines, and more particularly it pertains to machines for dispensing beverages in the form of single or individual drinks.

It is one of the objects of the present invention to provide a machine of the aforementioned type which, except for the insertion of a coin or other suitable device, will be entirely automatic in its operation.

It is another object of the invention to provide a machine which may be employed for dispensing either hot or cold beverages, which machine will maintain the beverage to be dispensed at the desired temperature, either hot or cold, without the use of any heating or cooling medium in connection with the machine.

It is another object of the invention to provide a novel form of dispensing valve, whereby a predetermined quantity or volume of liquid or beverage will be discharged upon each operation of the machine.

Still another object of the invention resides in the provision of a novel type of valve whereby each drink, may, if desired, be carbonated.

The present invention contemplates the use of a container for the fluid being dispensed, preferably in the form of a vacuum jacketed bottle, and it is a still further object of the invention to provide novel means for supporting such a container within a dispensing machine, and for facilitating its placement in, and removal from the machine.

Other objects of the invention relate to certain novel and improved constructions, arrangements and combinations of parts hereinafter described, and particularly pointed out in the claims, the advantages of which will be readily understood and appreciated by those skilled in the art.

The invention will be clearly understood from the accompanying drawings illustrating the invention in a preferred form, and the following detailed description of the constructions therein shown.

Figure 4:
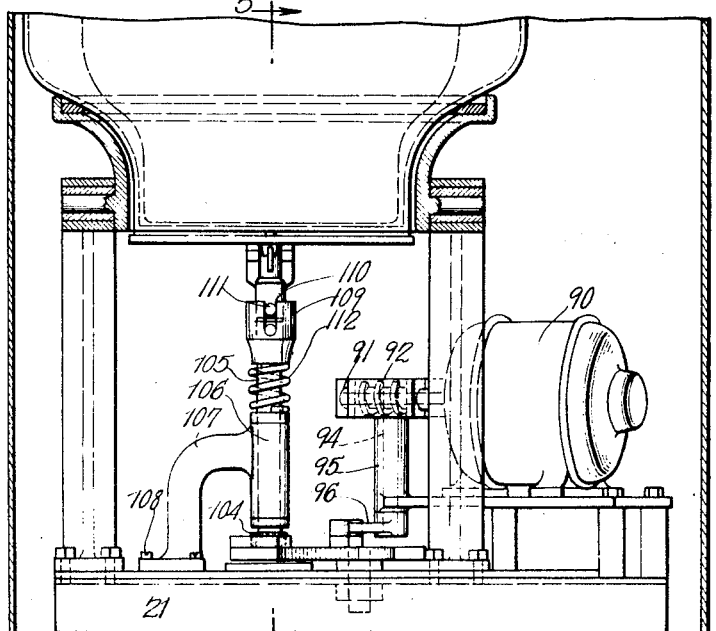

In the drawings:

Figure 1 is a view in front elevation of a machine constructed in accordance with the present invention, said figure illustrating a cup with a drink therein ready for removal from the machine, Figure 2 is a longitudinal sectional view on an enlarged scale, of the machine, taken on the line 2—2 of Figure 1, and illustrating the fluid or beverage container in a tilted position in dotted lines, Figure 3 is a horizontal sectional view taken on the line 3—3 of Figure 2, said figure being taken on an enlarged scale, Figure 4 is a vertical sectional view on an enlarged scale, taken on the line 4—4 of Figure 2, Figure 5 is a detailed sectional view on an enlarged scale taken on the line 5—5 of Figure 4, Figure 6 is a view partly in elevation and partly in section, taken on the line 6—6 of Figure 3, Figure 7 is an enlarged sectional view taken through the discharge opening or mouth of the fluid container illustrating the valve and the method of mounting the same in the discharge opening of the container, Figure 8 is a detail view illustrating the manner in which the valve is secured in, or pivotally mounted with respect to the discharge opening or mouth of the liquid container, Figure 9 is a detail view illustrating a novel coin control mechanism, Figure 10 is a detail sectional view of the coin controlled mechanism taken at right angles to Figure 9, Figure 11 is a detail view of a slightly modified form of valve illustrating the manner in which each individual drink may be charged with suitable gas such as carbonic gas, and;

Figure 12 is a detail sectional view of a slightly modified form of valve.

Referring specifically to the drawings, the machine comprises a housing or the like 20. This housing is preferably divided intermediate its ends by a suitable base or partition into two compartments 22 and 23. The upper compartment 23, preferably is employed for housing the operating mechanism and the container for the liquid to be dispensed, while the lower compartment 23 may be used for the storage of a container either filled or empty, and may also serve as a means for receiving used cups.

The housing 20 is provided in its front portion with a delivery opening 24 to which a cup may be moved after it has been filled with a drink and from which it may be freely removed by the operator. Also in the front of the housing 20, there is a coin chute 25, and in the lower or central portion of the housing 20, there is a chute like member 26 which has communication with the lower compartment 23, and through which used cups may be inserted into the said compartment 23.

The reference character 27 designates a liquid container or receptacle, and as more clearly illustrated in Figure 7, this receptacle or container is preferably thermally insulated by means of a vacuum jacket or the like 28. This feature of the container however forms no part of the present invention, although it is this type of container or receptacle which it is preferred to use in connection with the present invention.

This container has a relatively large discharge opening 29, and mounted in said discharge opening 29, there is a valve 30 for controlling the discharge of liquids from the container 27. This valve is preferably of the measuring type, and is adapted to discharge the liquid from the container 27 in predetermined or measured quantities which measured quantities correspond to a drink, and will be hereinafter referred to by the term "drink".

The valve 30 comprises a housing or outer member 31, within which is mounted an inner member 32. The inner member 32 is provided with trunnions or similar extensions 33 and 34, and the outer or housing member 31 is formed with bearings 35 and 36 in which the trunnions 33 and 34 are respectively mounted for the purpose of mounting the inner member 32 of the valve so that it may oscillate within the outer member or housing 31. The outer member or housing 31 is provided with an inlet opening 37 formed in its top wall, and an outlet opening 38 in its bottom wall, and leading from the outlet opening 38, there is a pipe like extension 39. The inner member 32 of the valve is provided with an inlet opening 40 and with a discharge opening 41.

The construction of valve just described is more clearly shown in Figure 7, and by reference to said figure it will be noted that the several parts therein are shown in liquid discharging position. If, however, the inner member 32 of the valve be moved so that its intake opening 40 will register with the intake opening 37 of the outer member or housing 31, the member 32 will fill with fluid and will thus measure a predetermined quantity or drink to be subsequently discharged, which is accomplished, by turning of the inner member 32 so that its discharge opening 41 registers with the opening 38 in the outer member or housing 31 whereupon the liquid passes from the inner member 32 to the pipe like extension 39. Leading from the pipe like extension 39, there is a pipe or the like 42, and connected thereto by a suitable coupling such as 43, there is a right angularly extending discharge spout 44 having a downwardly disposed discharge opening 45.

The container 27 is preferably mounted in a protecting jacket such as 47 which may be of metal and said container is supported by resilient blocks or the like 48 projecting from the interior surface of the casing or protecting jacket 47.

The valve 30, and the discharge spout 44, are carried by a cover such as 49 which is hingedly mounted as at 50 on the outer surface of the protector or jacket 47 and said cover is adapted for sliding and pivotal movement relative to the discharge opening 29 of the container 27. For engagement with the open end of the discharge opening 29 of the container 27, the cover 49 is provided with a soft rubber nipple like member 51 which projects into the discharge opening 29 of the container 27 when the cover 49 is in its closed position and for securing the cover 49 wing nuts such as 52 which are adapted to engage with bolts 53 carried by the protecting jacket 47 are employed. The hinge construction 50 is such as to permit of sliding and pivotal movement of the cover 49 relative to the discharge opening of the container 27, and by reference to Figure 8 it will be noted that the cover 49 has projecting therefrom a strap like member 54. The upper end of the strap like member 54 is pivotally mounted upon a transversely extending bolt or the like 55 which in turn is mounted in sleeves 56 which in turn are slidably mounted upon bolts or similar members 57 screw threaded as at 58 in lugs 59 carried by a plate or like member 60 secured as at 61 to the outer face of the protecting jacket 47.

By this last mentioned construction, it will be apparent that when the wing nuts 52 are loosened on the bolts 53, it being understood that there are a plurality of such wing nuts and bolts, the sleeves 56 will slide upon the bolts 57 and the nipple like member 51 will pass out of the discharge opening 29 of the receptacle 27. Thus it will be seen that access to the valve will be readily had for cleaning or repairing the same, and that the same in ordinary use is always a part of the liquid container 27 and its protecting jacket 47.

Extending from the trunnion 34 and keyed thereto as at 63, there is a stem like member 64, and connected thereto as at 65 there is a coupling member 66 the purpose of which will be hereinafter described.

As indicated in Figure 7, the valve member 30 heretofore described is mounted upon the inner face of the cover 49. It is desirable to insulate the valve in order that the temperature of the liquid in the container 27 may be maintained even or constant, and for this purpose it is supported by a thermal insulating member 70 preferably in the form of a cup like member secured as at 71 to the cover 49. This member 70 is formed from suitable thermal or heat insulating material of which the product known in the trade as "bakelite" is a fair example. The valve member 30 is secured to this valve support 70 by means of screws or the like 72, and thus it will be seen that all metal parts of the valve such as the member 31 and the member 32, are mounted upon the cover 49, and are insulated thermally therefrom by means of the valve supporting member 70. The pipe like member 42, and the discharge spout 44 heretofore described are also formed of suitable heat insulating materials as is also the stem like member 64 which operates the valve 30.

By this construction it will be seen that the liquid contained in the container 27 will not be subjected to outside temperature by conductivity, and can therefore be maintained at either a high or a low temperature as desired and dependent upon the character of the drink to be dispensed by the machine.

As heretofore stated, the container 27 is mounted in the upper compartment 22, and for supporting the container in operative position, a cradle 75 is employed. This cradle 75 is substantially a circular member and has trunnions 76 by means of which it may be tiltably mounted in standards or the like 77 extending vertically from the base 21 as more clearly shown in Figure 2. The rear wall of the upper compartment 22 is formed with a door or the like 78, and when said door is opened, the cradle 75 is free to rock about its trunnions to position the container 27 in that position shown in dotted lines in Figure 2, so that it may readily be removed from the cradle 75 when necessary to replace the same with a full container. Suitable latching means such as 79 may be employed to secure the cradle 75 in the position in which it is shown in full lines in Figure 2, thus insuring upright position of the container 27. This latching means 79 preferably consists of a spring pressed dog or the like 80 which is adapted for engagement with a standard 81 projecting vertically from the base 21.

Means is provided to operate the valve 30 through the medium of its valve stem 64 and coupling 66, and in the present embodiment of the invention, this means comprises an electric motor 90 and a train of gearing connecting the motor 90 with the stem like member 64 which train of gearing will now be described.

Projecting from the motor 90, there is a stub shaft 91, and carried by said stub shaft 91, there is a worm gear 92. This worm gear 92 engages and drives a suitable gear 93 mounted upon the upper end of a vertically disposed shaft 94 illustrated in Figure 4. The vertically disposed shaft is mounted in a vertical bearing sleeve or the like 95, and upon its lower end it is provided with a crank or the like 96. Pivotally mounted as at 97 on the base 21, there is an arm or the like 98 and carried by said arm 98, there are two projecting studs 99 and 100. By this construction it will be apparent that as the motor operates the vertical shaft 94, the crank 96 will alternately engage the studs 99 and 100, and will rock the arm 98 about its pivotal point 97 causing it to oscillate. Projecting from the arm 98, there is a short arm 102, and carried by said short arm 102, there is a segmental gear or rack 103. This segmental gear or rack 103 engages a gear 104 carried by a shaft 105 mounted in a bearing 106 carried by an arm 107 secured to the base 21 as at 108 in Figure 4. The upper end of this shaft 105 carries a coupling member 109 which is notched as at 110 to engage a cross pin 111, carried by the coupling member 66 of the stem like member 64 of the valve 30, and a spring 112 may be employed to maintain the cross pin 111 in the coupling member 109.

Thus it will be seen that each time that the arm 98 is oscillated, through the medium of the segmental gear or rack 103, and the gear 104, the shaft 105 will be driven and through the medium of the coupling members 66 and 109, the valve member 32 will be operated to cause its ports or openings to register with the ports or openings in the member 31 of the valve in the manner heretofore described in order that a drink may be taken into the valve member 30 and discharged therefrom into the discharge spout 44.

The reference numeral 125 designates a suitable cup supplying mechanism, and this mechanism will not be specifically herein described, inasmuch as it is specifically described and forms a very important part of the mechanism in my co-pending application, Serial Number 424,249, filed January 29, 1930. Sufficient to say that there is a supply of cups 126 which are delivered singly by the reciprocation of a member 127. This member is reciprocated to discharge the cups 126 singly by means of a cam 128, mounted upon the arm 98 in such a manner that as said arm swings to the right in Figure 3, a cup 126 will be deposited in the cup holder 129 carried near the free end or outer end of said arm 98 and upon the return movement of the arm 98 as heretofore described, the cup will be positioned in front of the opening 24 as illustrated in Figure 1.

In Figure 6, there is illustrated a coin actuated switch for control of the motor 90, and this mechanism preferably comprises two contacts 130 and 131, between which there is adapted for engagement an arm 132 which will engage both of said contacts and complete a circuit to the motor 90 which circuit is not herein illustrated. The arm 132 is carried by a second arm 133 pivotally mounted as at 134, and pivotally connected as at 135 to the arm 133, there is a vertically extending rod 136. The lower end of this rod 136 is connected to a lever or the like 137 pivotally mounted as at 138, the rod 136 being connected to the lever 137 as at 139. Pivotally mounted as at 140, there is a trigger 141 and the end 142 of said trigger lies beneath a coin chute 143 in such a manner that a coin passing through the chute 143 will engage or strike the end 142 of the trigger 141 and rock the same about its pivotal point 140. The trigger 141 has a projection 144 which overlies the end of the lever 137 and prevents movement thereof about its pivotal point when the trigger is set as illustrated in Figure 6. Carried by the arm 98, there is a right angular bracket 145 and pivotally mounted in the lower end thereof there is a cam member 146 which is adapted for engagement with the depending portion 147 of the lever 137 to rock the same about its pivotal point in order to set the same after it has been tripped by a release of the trigger 141 in a manner to be hereinafter described.

For holding the lever 137 in the position in which it is shown in Figure 6, the spring pressed pawl 148 is employed and it engages a projection upon the lever 137 as illustrated in Figure 6. Pivotally mounted upon the lever 137 as at 150, there is a spring pressed pawl 151, and this spring pressed pawl 151 is adapted to singly engage the teeth 152 of a ratchet wheel 153. This ratchet wheel 153 forms a part of a counting mechanism, and it is provided on its periphery with a notch 154 which is adapted to receive a roller or projection 155 carried by a pawl 156. This pawl 156 engages a nose 157 carried upon the lower end of a barrier 158 which is pivotally mounted as at 159. This barrier 158 is adapted to move across the upper end of the coin chute 143 to prevent insertion of a coin in the chute when the machine is empty, and this is accomplished by engagement of the roller or other projection 155 in the recess 154 of the ratchet wheel 153 which action releases the pawl 156 and permits the barrier 158 to swing across the upper end of the coin chute 143.

The coin mechanism is illustrated in Figures 9 and 10, and is so constructed and arranged as to exclude all coins, slugs or the like which are of not the proper shape, form or denomination.

Projecting inwardly of the housing 20, there is a relatively short coin chute 160 and its inner end 161 is so positioned as to deposit coins, slugs or the like which pass through the chute 160 upon a swinging or tiltable platform or table 162. The swinging platform or table 162 is pivotally mounted as at 163, and is preferably counterbalanced by a weight 164 by means of which it may be very sensitively adjusted to respond in the proper manner to coins of a predetermined weight. The reference character 165 designates a housing, and in said housing there are two partitions 166 and 167 which partitions, together with the outer walls of the housing form passageways 168, 169 and 170. The passageway 169 leads to the coin chute 143 heretofore mentioned and its lower end is disposed directly above the end 142 of the trigger member 141 as best illustrated in Figures 9 and 10. A coin pocket or the like 170 is provided and this pocket is adapted to receive coins of improper weight or denomination as well as slugs or other devices which are introduced into the machine but which are of a spurious nature.

In Fig. 11, there is shown a construction whereby carbonic gas may be introduced into each individual drink, and in this type of device, the lower wall of the valve housing 31 is provided with a nipple or the like 180 to which is threaded a pipe or the like 181. In the pipe 181, there is a valve 182 which is of the tapering type, and is normally held to its seat 183 by means of a coil spring 184. The pipe 181 may be connected in any desired manner to a pipe 185 which in turn is connected to a tank or other supply of carbonic gas under suitable pressure which may be indicated by a gauge 187. In this construction, the pipe 185 is at all times in communication with the tank 186 when the device is set up for use, but it may be closed against communication with the tank 186 by means of a suitable hand operated valve 188. Carried by the stem member 64 of the valve, there is a cam 189 which is adapted to engage a lever 190 pivoted as at 191, and as the stem member 64 rotates this tripping cam 189 will rock the lever 190 about its pivotal point, and its free end 192 will unseat the valve against the action of the spring 184, and will permit of a small charge of carbonic or other gas to enter the pipe 181. This operation is timed in accordance with the operation of the valve, and this arrangement of timing is such that the aforementioned operation will take place at the time a relatively small port 193 in the lower wall of the valve 30 will be in registration with the passage through the pipe 181.

In Figure 12 of the drawings, there is shown a modified construction in which the valve is insulated by means of a vacuum chamber which spaces the valve from the exterior of the container.

In this form of the invention, the cover is designated 100' and secured thereto as at 102' there is a valve fitting 101'. This valve fitting 101' is preferably formed from glass, and is hollow as indicated at 103'. This hollow portion has the air exhausted therefrom to provide a vacuum insulating space for the valve 30 which together with its operating means is of substantially the same construction as in the preferred form of the invention.

While the invention has been herein illustrated in what are at present its preferred forms, it is to be understood that it is not to be limited to the exact arrangements and constructions illustrated, and that it may be carried out in other forms without departing from the spirit thereof, and from the scope of the appended claims.

Having thus described the invention, what I claim as new and desire to secure by U. S. Letters Patent, is;

1. In a vending machine, a cup dispensing mechanism, a liquid dispensing mechanism, an oscillating arm movable from the cup dispensing mechanism to the liquid dispensing mechanism, a pair of spaced pins on said arm and means continuously rotating in one direction for alternately engaging said pins to oscillate said arm.

2. In a vending machine, a cup dispensing mechanism, a liquid dispensing mechanism, an oscillating arm movable from the cup dispensing mechanism to the liquid dispensing mechanism, a pair of spaced pins on said arm and rotating means for alternately engaging said pins to oscillate said arm, said last mentioned means comprising a motor driven crank.

3. In a vending machine, a cup dispensing mechanism, a liquid dispensing mechanism and means for transferring a cup from the cup dispensing mechanism to the liquid dispensing mechanism, said means comprising an arm, a single cup receiving means carried by said arm, a pair of spaced pins carried by said arm, a rotary crank adapted to alternately engage said pins to oscillate said arm, and a motor for rotating said crank.

GEORGE E. COOK.